US011814134B2

(12) United States Patent
Corder (10) Patent No.: US 11,814,134 B2
(45) Date of Patent: Nov. 14, 2023

(54) PIVOTING CRANK ARM FOR INCREASED TORQUE

(71) Applicant: John Daniel Corder, Upland, CA (US)

(72) Inventor: John Daniel Corder, Upland, CA (US)

( * ) Notice: Subject to any disclaimer, the term of this patent is extended or adjusted under 35 U.S.C. 154(b) by 0 days.

(21) Appl. No.: 18/060,876

(22) Filed: Dec. 1, 2022

(65) Prior Publication Data

US 2023/0192229 A1 Jun. 22, 2023

Related U.S. Application Data (63) Continuation-in-part of application No. 29/819,682, filed on Dec. 16, 2021.
(60) Provisional application No. 63/291,266, filed on Dec. 17, 2021.

(51) Int. Cl.
*B62M 3/08* (2006.01)
*B62M 1/10* (2010.01)
*B62M 3/00* (2006.01)

(52) U.S. Cl.
CPC .............. *B62M 1/105* (2013.01); *B62M 3/08* (2013.01); *B62M 2003/006* (2013.01)

(58) Field of Classification Search
CPC ..... B62M 3/06; B62M 3/08; B62M 2003/006
USPC ....................................................... 74/594.3
See application file for complete search history.

(56) References Cited

U.S. PATENT DOCUMENTS

| 5,279,524 A | 1/1994 | Hilber | |
| 6,152,471 A * | 11/2000 | Kang | B62M 3/04 |
| | | | 280/259 |
| 6,253,639 B1 * | 7/2001 | Richardson | B62M 3/04 |
| | | | 74/594.3 |
| 8,602,434 B2 * | 12/2013 | Woods | B62M 1/36 |
| | | | 280/200 |
| 9,403,576 B2 | 8/2016 | den Boer | |
| 10,668,977 B2 | 6/2020 | Corder | |
| 11,142,281 B2 | 10/2021 | den Boer et al. | |
| 2006/0027994 A1 * | 2/2006 | Misevski | B62M 3/06 |
| | | | 280/259 |

(Continued)

FOREIGN PATENT DOCUMENTS

| AT | 500463 A2 * | 1/2006 | ............. B62M 3/04 |
| DE | 3425342 A1 * | 1/1986 | ............. B62M 1/02 |
| DE | 102010053629 B4 * | 1/2014 | ............. B62M 3/06 |

(Continued)

OTHER PUBLICATIONS

Machine translation of AT 500463 A2, Johann, Jan. 15, 2006 (Year: 2006).*

(Continued)

*Primary Examiner* — Vinh Luong (57) ABSTRACT

A pivoting crank arm apparatus that increases the user's torque. The pivoting of the crank arms further allows the user to quickly move the pedals out of the dead zones at the top dead center and bottom dead center of the crank cycle. This prevents the user from stalling in these dead zones while climbing hills and other high torque or slow pedal speed situations.

The pivoting crank arm apparatus is comprised of a set of crank arms attached by a spindle. Each crank arm is further comprised of a pivot arm with a pedal. The pivot arm being pivotally attached to the crank arm and configured to allow for the pivoting action of the present invention.

13 Claims, 6 Drawing Sheets

(56) References Cited

U.S. PATENT DOCUMENTS

2013/0247712 A1\* 9/2013 Chen .................. B62M 3/06
　　　　　　　　　　　　　　　　　　　74/594.1
2017/0313378 A1 11/2017 Abrantes Perfeito et al.

FOREIGN PATENT DOCUMENTS

WO　　　WO 9922981 A1 \* 5/1999 ............. B62M 3/04
WO　　　　2005014385 A1　2/2005

OTHER PUBLICATIONS

English abstract of DE 3425342 A1, Guenther, Jan. 16, 1986 (Year: 1986).\*
Machine translation of DE 102010053629 B4, Franz, Jan. 16, 2014 (Year: 2014).\*

\* cited by examiner

PIVOTING CRANK ARM FOR INCREASED TORQUE

FIELD OF THE INVENTION

The present invention relates generally to bicycles. More specifically to a pivoting crank arm which provides increased torque.

BACKGROUND OF THE INVENTION

When operating a bicycle or similar vehicle, the vehicle is propelled forward by the user rotating a set of pedals around a crank gear. During the course of rotating this crank gear, there are two dead zones that occur. These dead zones occur at the very top of the crank gear, referred to as top dead center, and at the very bottom of the crank gear, referred to as bottom dead center.

The top dead center dead zone is created as the top pedal moves upwards towards top dead center. As the top pedal reaches top dead center, the upward movement slows and then stops at top dead center. The same occurs at the same time as the bottom pedal moves downwards towards bottom dead center and the downward movement slows and then stops at bottom dead center. The user is now in a dead zone and needs to start the top pedal moving downward and the bottom pedal moving upward.

In situations where the user is pedaling at a slow speed or needs to apply a consistent amount of high torque, such as climbing a hill, the user may stall or stop moving during these dead zones.

Therefore, there is a need for a solution to assist the user during these dead zones when the user is hill climbing or in other similar slow pedal speed or high torque situations.

SUMMARY OF THE INVENTION

The present invention is a pivoting crank arm apparatus comprised of a set of crank arms attached by a spindle. Each crank arm is further comprised of a pivot arm with a pedal. The pivot arm is configured to create a pivoting action which allows the pedal to pivot forwards or backwards with respect to the crank arm.

With the present invention when the top pedal reaches top dead center, the pivot arm allows the pedal to pivot forward. This forward pivoting allows the pedal to leave the top dead center dead zone and move quickly and easily into a downward motion. At the same time as the bottom pedal approaches bottom dead center, it is whipped through bottom dead center by the pivoting action of the pivot arm and into an upward motion.

The pivoting action created by the present invention, essentially eliminate the dead zones in the crank cycle. Thereby leading to a smooth and efficient crank cycle and significantly reducing stalling during hill climbing.

DETAIL DESCRIPTIONS OF THE INVENTION

All illustrations of the drawings are for the purpose of describing selected versions of the present invention and are not intended to limit the scope of the present invention.

The present invention is a pivoting crank arm apparatus which increases the amount of torque applied by the user during the crank cycle. The pivoting crank arm apparatus further reduces or eliminates the dead zones during the crank cycle. The pivoting crank arm apparatus comprises a spindle 10, a first crank arm 20, a second crank arm 25, a first pivot arm 30, a second pivot arm 35, a first pedal 40, and a second pedal 45.

The spindle 10 of the present invention is rotatably attached to the frame of the bicycle or similar vehicle. This rotatable attachment positions the present invention on the vehicle and forms an axis which the other components of the present invention rotate about. The spindle 10 has a first side 11 and a second side 12. The spindle 10 can be embodied by any suitable means such as but not limited to a shaft surrounded by bearings.

The spindle 10 is further comprised of a crank gear 14. The crank gear 14 being rotational fixed to the spindle 10, so as the spindle 10 is rotated, the crank gear 14 is also rotated. The crank gear 14 further transmits the rotational energy provided by the user to the chain or similar propulsion of the vehicle. The crank gear 14 can be embodied by many forms such as but not limited to a single gear, or a set of gears.

The first crank arm 20 and second crank arm 25 of the present invention are attached to the spindle 10. When the crank arms are rotated by the user, the crank arms apply a rotational force to the spindle 10 and thereby the crank gear 14. In the preferred embodiment, both the first crank arm 20 and the second crank arm 25 have a gear end and a pivot end. The gear end 21 of the first crank arm 20 is affixed to the first side 11 of the spindle 10 and the gear end 26 of the second crank arm 25 is affixed to the second side 12 of the spindle 10. The pivot ends of the first crank arm 20 and the second crank arm 25 extend outward perpendicular to the spindle 10 axis. Any suitable method may be used to affix the first crank arm 20 and second crank arm 25 to the spindle 10 such as attaching directly to the spindle 10 with fasteners or connected a crank arm to the crank gear 14.

The first pivot arm 30 and the second pivot arm 35 of the present invention are pivotally connecting to crank arms. The first pivot arm 30 being pivotally connected to the first crank arm 20 and the second pivot arm 35 being pivotally connected to the second crank arm 25. In the preferred embodiment of the present invention, the first pivot arm 30 and the second pivot arm 35 have a spring end, a pivot point, and a pedal end. The pivot point 32 of the first pivot arm 30 being the location where the first pivot arm 30 and the pivot end 22 of the first crank arm 20 are pivotally connected. The pivot point 37 of the second pivot arm 35 and the pivot end 27 of the second crank arm 25 being pivotally connected in the same fashion. In some embodiments, the pivot point of the first pivot arm 30 and the second pivot arm 35 is the midpoint or the exact middle of the pivot arm. Other embodiments have the pivot point at other locations along the length of the first pivot arm 30 and second pivot arm 35. The spring end of the first pivot arm 30 and the second pivot arm 35 being the end of the pivot arm that is adjacent the spindle 10. The pedal end being the end that is opposite the spring end.

Figure 1:
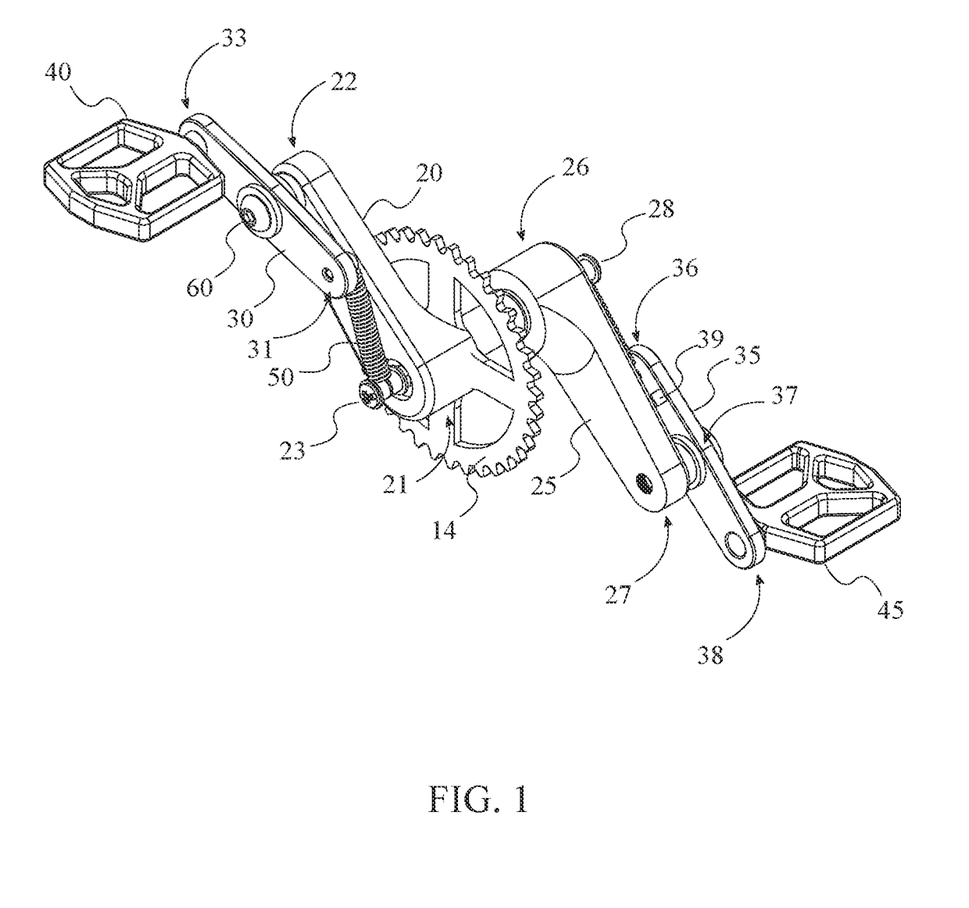
FIG. 1. shows a rear right top prospective view of a preferred embodiment of the present invention.
Figure 2:
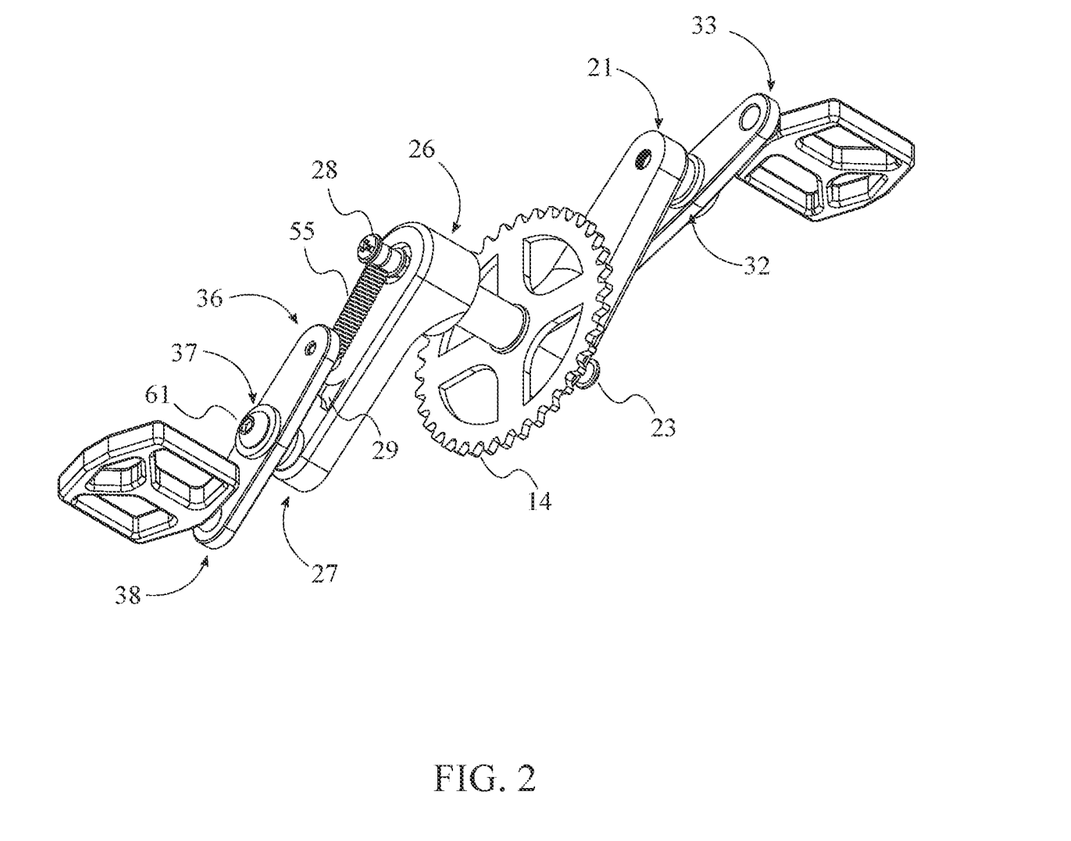
FIG. 2. shows a front left bottom prospective view of a preferred embodiment of the present invention FIG. 3. shows a left elevation view of a preferred embodiment of the present invention.
Figure 3:
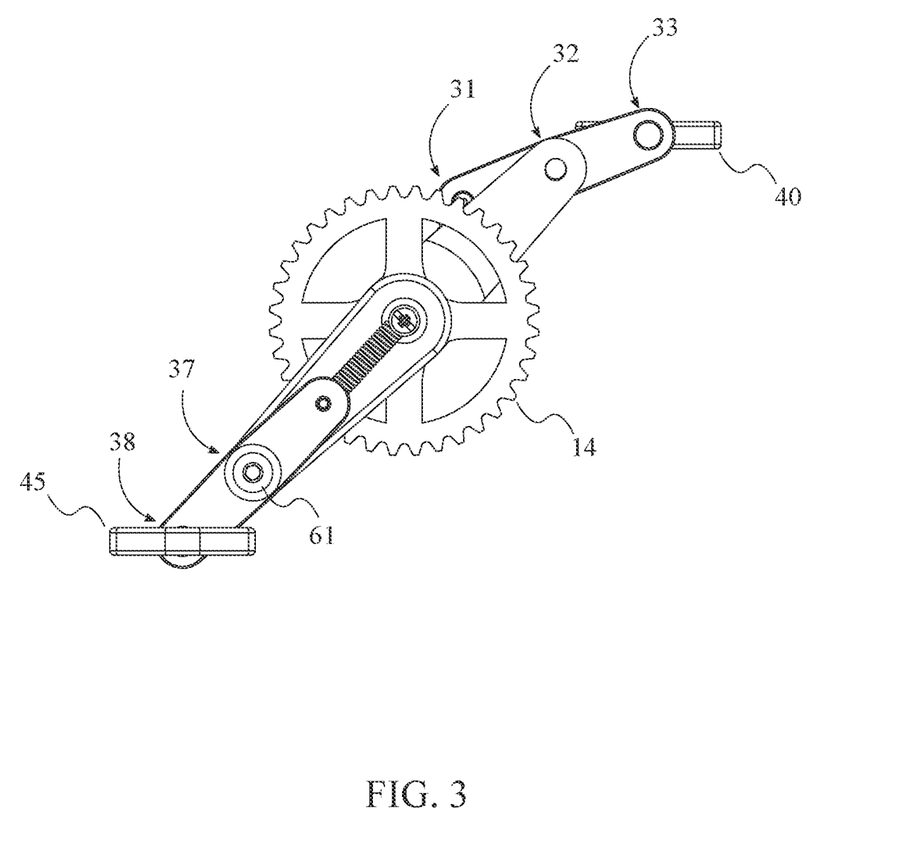
Figure 4:
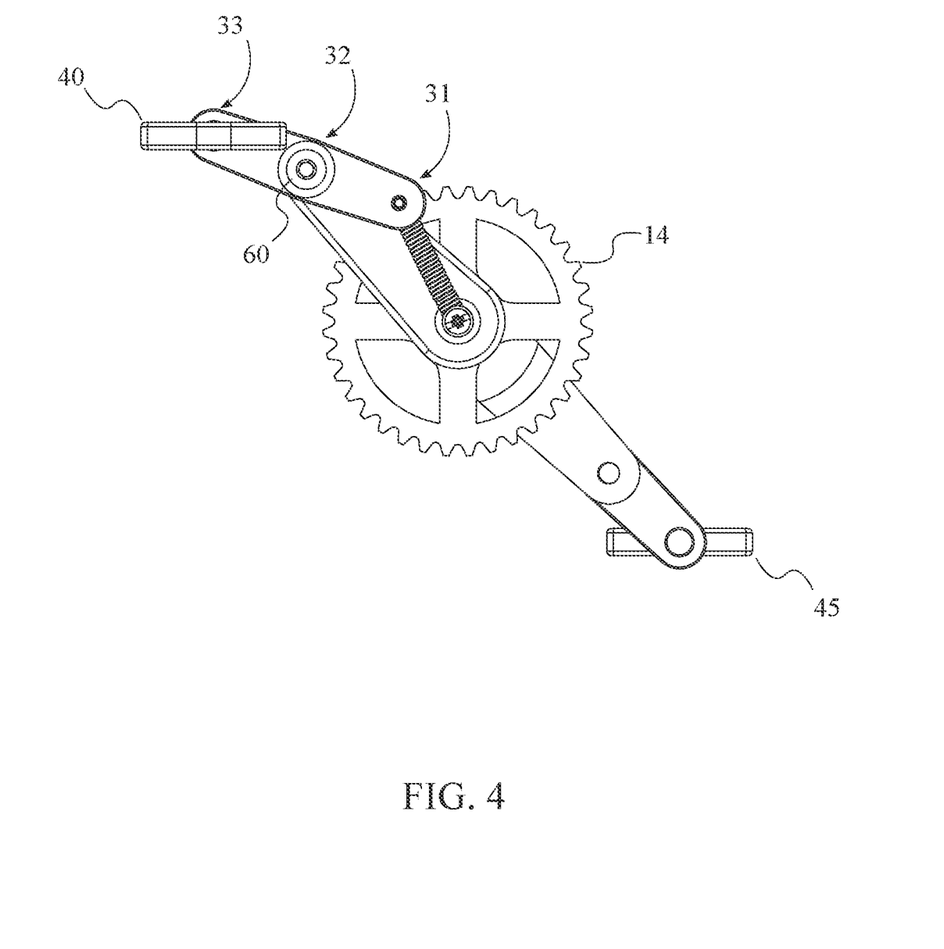
FIG. 4. shows a right elevation view of a preferred embodiment of the present invention with the first pivot arm being pivoted forward.
Figure 5:
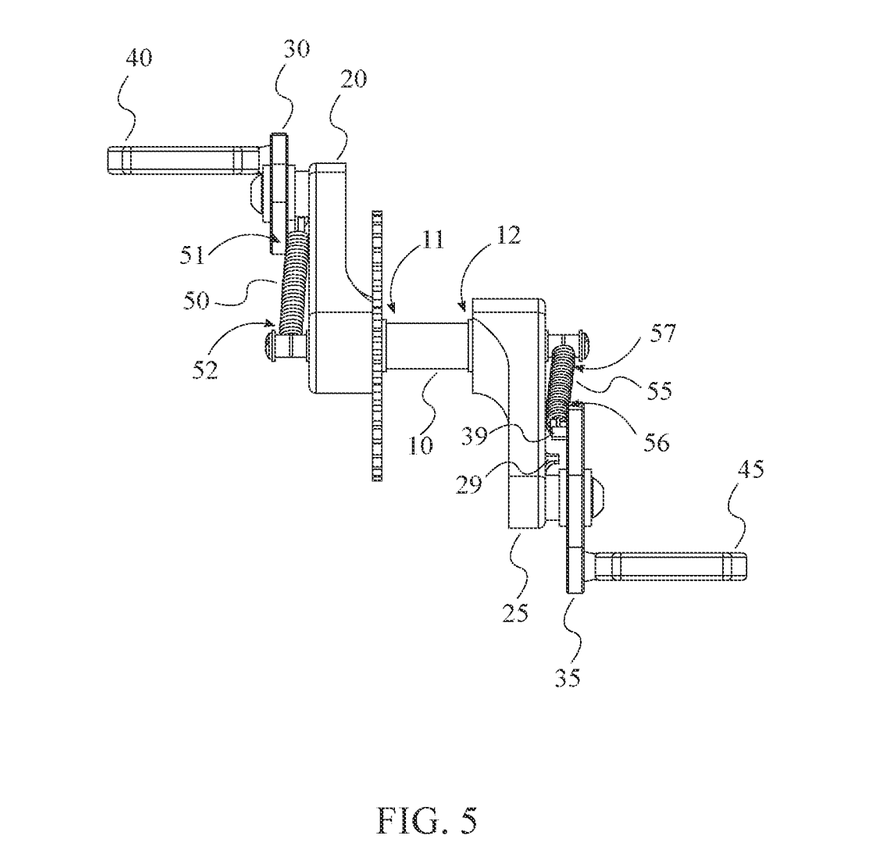
FIG. 5. shows a rear elevation view of a preferred embodiment of the present invention.
Figure 6:
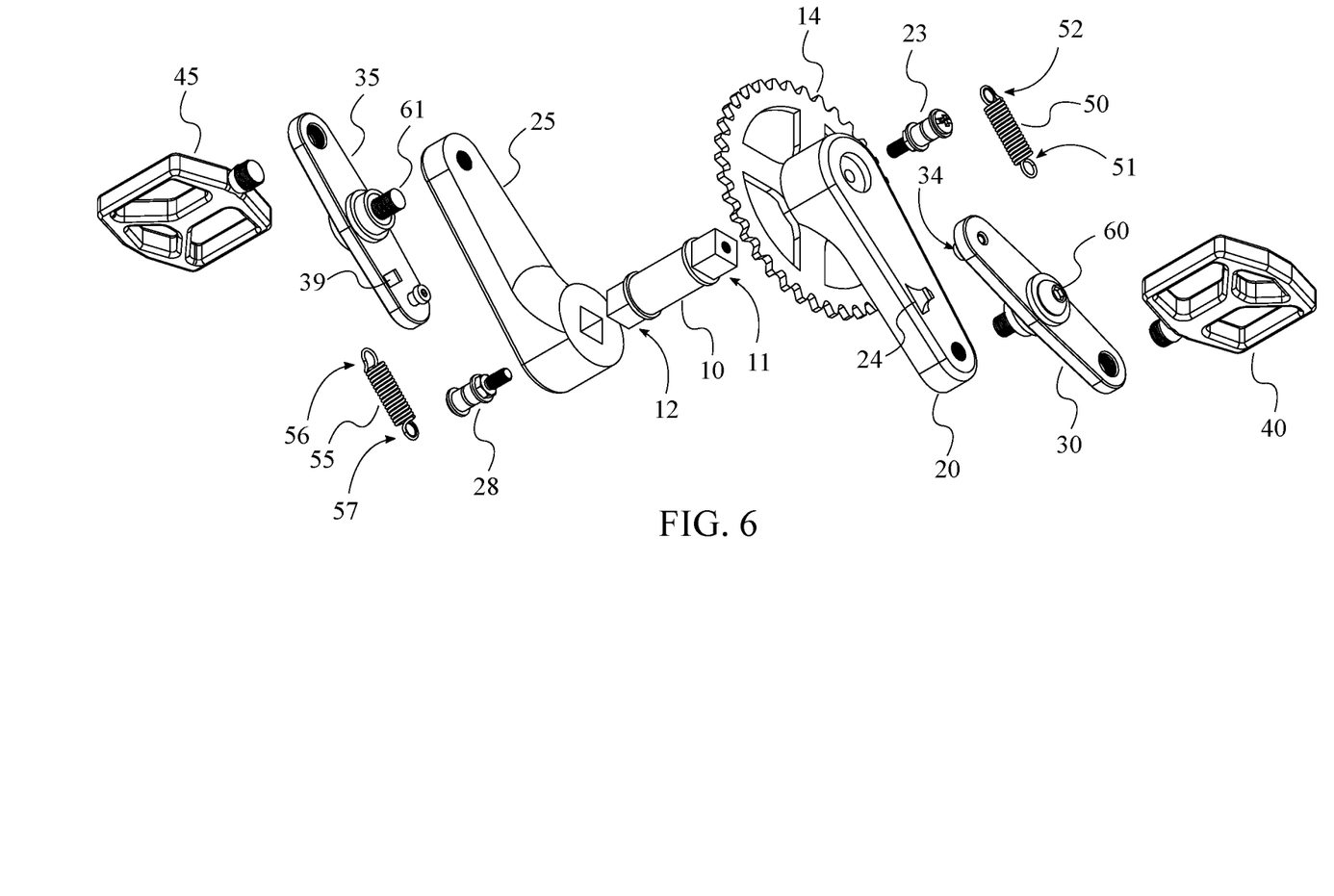
FIG. 6. shows an exploded view of a preferred embodiment of the present invention.

The pivot point of the first pivot arm 30 and the second pivot arm 35 may be pivotally connected to the pivot end of the first crank arm 20 and the second crank arm 25 through any suitable means which include but are not limited to a pivot which is molded into one of the members or pivoting about a pin. In the present invention, the preferred embodiment is further comprised of a first pivot pin 60 and a second pivot pin 61. In the preferred embodiment, the first pivot pin 60 is inserted through the pivot point 32 of the first pivot arm 30 and allows the first pivot arm 30 to rotate about the first pivot pin 60. The first pivot pin 60 is then threaded into and affixed to pivot end 22 of the first crank arm 20. Thereby, the first pivot pin 60 creates a pivotal connection between the first pivot arm 30 and the first crank arm 20. The second pivot pin 61 is used to pivotally connect the second pivot arm 35 and the second crank arm 25 in the same fashion.

In most embodiments of the present invention there is a need to restrict the pivotal range that the first pivot arm 30 and the second pivot arm 35 are allowed to rotate about the pivot point. Limiting the pivotal range or pivotal travel of the first pivot arm 30 and the second pivot arm 35 about their pivot point can be accomplished through any suitable means which includes but is not limited to the use of any combination of stops, the use of protrusions or pins within a groove, or the use of a spring or other elastic device. Further the present invention may employ more than one means of limiting the pivotal travel of the pivot arm about the pivot point.

In the preferred embodiment, the present invention is further comprised of a first spring 50 and a second spring 55. The first spring 50 and the second spring 55 having an upper end and a lower end. In the preferred embodiment, the upper end 51 of the first spring 50 is attached to the spring end 31 of the first pivot arm 30. In the same fashion, the upper end 56 of the second spring 55 is attached to the spring end 36 of the second pivot arm 35. The lower end 52 of the first spring 50 is attached to the first crank arm 20 and the lower end 57 of the second spring 55 is attached to the second crank arm 25. In this fashion, the springs are used to limit the pivotal travel of the pivot arms about their pivot points.

Further, in the preferred embodiment, the first crank arm 20 of the present invention is further comprised of a first spring attachment 23 and the second crank arm 25 of the present invention is further comprised of a second spring attachment 28. In the preferred embodiment, the first spring attachment 23 is mounted to the first crank arm 20 and provides a solid attachment point for the lower end 52 of the first spring 50. In the same fashion, the second spring attachment 28 is mounted to the second crank arm 25 and provides a solid attachment point for the lower end 57 of the second spring 55. In other embodiments, any suitable means may be used to attach the spring to the pivot arms and the crank arms.

In a further embodiment of the present invention, the first pivot arm 30 further comprises a first stop 34, the second pivot arm 35 further comprises a second stop 39, the first crank arm 20 further comprises a first protrusion 24 and the second crank arm 25 further comprises a second protrusion 29. In this further embodiment, the first stop 34 is positioned along the first pivot arm 30 so that when the pivot arm is at a desired pivotal position, the first stop 34 interferes with the first protrusion 24 of the first crank arm 20. This interference does not allow the first stop 34 to travel past the first protrusion 24, thereby creating a maximum pivotal travel limit or stop for the first pivot arm 30. In this same fashion the second stop 39 is positioned along the second pivot arm 35 to limit the pivotal travel of the second pivot arm 35 by interference with the second protrusion 29. In the preferred embodiment, the first stop 34, second stop 39, first protrusion 24, and second protrusion 29 are positioned to limit the pivotal travel of as the first pivot arm 30 and second pivot arm 35 are traveling forward in the crank cycle but stops may be positioned for limiting pivotal travel in either direction or in both directions.

In even further embodiments, the need for a first spring 50 and a second spring 55 may be eliminated through the use of stops or other means of limiting the pivotal travel of the first pivot arm 30 and the second pivot arm 35.

The first pedal 40 and the second pedal 45 of the present invention serve the function of giving the user a surface or platform with which to press and rotate the pivot arms and crank arms and thereby rotate the crank gear 14. Any suitable embodiment of pedal may be utilized with the present invention including but not limited to flat bicycle pedals or clipless pedals. In the preferred embodiment, clipless pedals are utilized. Clipless pedals allow the user to attach their feet to the pedals and allow the user to not only press downward on a pedal, but to also lift the pedals upward. In the preferred embodiment, the first pedal 40 is rotatably connected to the pedal end 33 of the first pivot arm 30. In the same fashion, the second pedal 45 is rotatably connected to the pedal end 38 of the second pivot arm 35. The rotatable connection allowing the first pedal 40 and the second pedal 45 to remain substantially parallel to the ground as the user rotates the pedals about the crank gear 14.

The present invention is used as a solution to the problem of a user getting stuck or stalled in the dead zone of the crank cycle. The crank cycle being the process of a user rotating the pedals around the crank gear 14, one cycle being one rotation about the crank gear 14. During the crank cycle, the user's pedals reach a dead zone when one pedal is at the top dead center and the opposite pedal is at the bottom dead center. The dead zone at the top of the crank cycle is caused when the top pedal is moved upwards towards top dead center. As the top pedal reaches top dead center, the upward movement slows and then momentarily pauses at top dead center. The same occurs at the same time as the bottom pedal moves downward to bottom dead center and the downward movement slows and then momentarily pauses at bottom dead center. The user is now in a dead zone and needs to start the top pedal moving downward and the bottom pedal moving upward.

In situations where the user is pedaling at a slow speed or needs to apply a consistent amount of high torque, such as climbing a hill, the user may stall during these dead zones. This stalling or stopping of the crank cycle in most cases leads to a stopping of the forward progress and need to reset or restart.

With the present invention, when the top pedal reaches top dead center, the pivot arm allows the pedal to pivot forward and into the downward motion. This forward pivoting gets the top pedal quickly and easily out of top dead center and into the downward motion of the crank cycle. At the same time, the bottom pedal as it approaches bottom dead center is whipped through bottom dead center by the pivoting action of the pivot arm.

The first spring 50 and the second spring 55 of the present invention, further assist the pivoting action so that tension can be built up within the spring and then released as added torque at top dead center and bottom dead center.

Some embodiments may utilize stop such as the first stop 34 and second stop 39. These stops limit the maximum pivotal travel of the first pivot arm 30 and the second pivot arm 35. By limiting travel these stops further limit the maximum force that is applied to the springs which helps to reduce fatigue and breakage of the springs. Further some user may want to stand on their pedals at various stages of the crank cycle. The addition of stops allows for a solid pedal position to stand upon.

When used at typical speeds and normal operation, the present invention adds further efficiency and comfort for the user. As the user pedals through top dead center and bottom dead center, the present invention smooths the transition through top and bottom dead center. Further the spring assists in whipping the pedal through these dead zones and provides a smoother crank cycle and a smoother crank cycle is a more efficient crank cycle.

Although the invention has been explained in relation to its preferred embodiment, it is to be understood that many other possible modifications and variations can be made without departing from the spirit and scope of the invention.

What is claimed is:

1. A pivoting crank arm apparatus comprises:
a spindle;
a first crank arm;
a second crank arm;
a first pivot arm;
a second pivot arm;
a first pedal;
a second pedal;
the spindle having a first side and a second side;
the first crank arm having a gear end and a pivot end;
the second crank arm having a gear end and a pivot end;
the first pivot arm having a spring end, a pivot point, and a pedal end;
the second pivot arm having a spring end, a pivot point, and a pedal end;
the gear end of the first crank arm being affixed to the first side of the spindle;
the gear end of the second crank arm being affixed to the second side of the spindle;
the pivot point of the first pivot arm being pivotally connected to the pivot end of the first crank arm;
the pivot point of the second pivot arm being pivotally connected to the pivot end of the second crank arm;
the first pedal being rotatably connected to the pedal end of the first pivot arm;
the second pedal being rotatably connected to the pedal end of the second pivot arm;
the first pivot arm further comprises a first stop;
the second pivot arm further comprises a second stop;
the first crank arm further comprises a first protrusion;
the second crank arm further comprises a second protrusion;
the first stop being positioned to limit the pivotal travel of the first pivot arm by interference with the first protrusion; and
the second stop being positioned to limit the pivotal travel of the second pivot arm by interference with the second protrusion.

2. The apparatus as claimed in claim 1 comprises:
a first spring;
a second spring;
the first spring having an upper end and a lower end;
the second spring having an upper end and a lower end;
the upper end of the first spring being attached to the spring end of the first pivot arm;
the upper end of the second spring being attached to the spring end of the second pivot arm;
the lower end of the first spring being attached to the first crank arm; and
the lower end of the second spring being attached to the second crank arm.

3. The apparatus as claimed in claim 2 comprises:
the first crank arm further comprises a first spring attachment;
the second crank arm further comprises a second spring attachment;
the lower end of the first spring being attached to the first spring attachment; and
the lower end of the second spring being attached to the second spring attachment.

4. The apparatus as claimed in claim 1 comprises:
a first pivot pin;
a second pivot pin;
the first pivot pin pivotally connecting the pivot point of the first pivot arm to the pivot end of the first crank arm; and
the second pivot pin pivotally connecting the pivot point of the second pivot arm to the pivot end of the second crank arm.

5. The apparatus as claimed in claim 1 comprises:
the first pivot point is the midpoint of the first pivot arm; and
the second pivot point is the midpoint of the second pivot arm.

6. The apparatus as claimed in claim 1 comprises:
the first pedal and the second pedal are clipless pedals.

7. The apparatus as claimed in claim 1 comprises:
the spindle further comprises a crank gear.

8. A pivoting crank arm apparatus comprises:
a spindle;
a first crank arm;
a second crank arm;
a first pivot arm;
a second pivot arm;
a first pedal;
a second pedal;
a first spring;
a second spring;
the spindle having a first side and a second side;
the first crank arm having a gear end and a pivot end;
the second crank arm having a gear end and a pivot end;
the first pivot arm having a spring end, a pivot point, and a pedal end;
the second pivot arm having a spring end, a pivot point, and a pedal end;
the gear end of the first crank arm being affixed to the first side of the spindle;
the gear end of the second crank arm being affixed to the second side of the spindle;
the pivot point of the first pivot arm being pivotally connected to the pivot end of the first crank arm;
the pivot point of the second pivot arm being pivotally connected to the pivot end of the second crank arm;
the first pedal being rotatably connected to the pedal end of the first pivot arm;
the second pedal being rotatably connected to the pedal end of the second pivot arm;
the first spring having an upper end and a lower end;
the second spring having an upper end and a lower end;
the upper end of the first spring being attached to the spring end of the first pivot arm;

the upper end of the second spring being attached to the spring end of the second pivot arm;

the lower end of the first spring being attached to the first crank arm;

the lower end of the second spring being attached to the second crank arm;

the first pivot arm further comprises a first stop;

the second pivot arm further comprises a second stop;

the first crank arm further comprises a first protrusion;

the second crank arm further comprises a second protrusion;

the first stop being positioned to limit the pivotal travel of the first pivot arm by interference with the first protrusion; and the second stop being positioned to limit the pivotal travel of the second pivot arm by interference with the second protrusion.

9. The apparatus as claimed in claim 8 comprises:

the first crank arm further comprises a first spring attachment;

the second crank arm further comprises a second spring attachment;

the lower end of the first spring being attached to the first spring attachment; and the lower end of the second spring being attached to the second spring attachment.

10. The apparatus as claimed in claim 8 comprises:

a first pivot pin;

a second pivot pin;

the first pivot pin pivotally connecting the pivot point of the first pivot arm to the pivot end of the first crank arm; and the second pivot pin pivotally connecting the pivot point of the second pivot arm to the pivot end of the second crank arm.

11. The apparatus as claimed in claim 8 comprises:

the first pivot point is the midpoint of the first pivot arm; and the second pivot point is the midpoint of the second pivot arm.

12. The apparatus as claimed in claim 8 comprises:

the first pedal and the second pedal are clipless pedals.

13. The apparatus as claimed in claim 8 comprises:

the spindle further comprises a crank gear.

\* \* \* \* \*